United States Patent
Jakobs et al.

(10) Patent No.: US 9,575,873 B2
(45) Date of Patent: Feb. 21, 2017

(54) SOFTWARE TESTING SYSTEM AND METHOD

(71) Applicant: SAP SE, Walldorf (DE)

(72) Inventors: Daniel Jakobs, Ettlingen-Buchhausen (DE); Marco Glaser, Bad Herrenalb (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/026,537

(22) Filed: Sep. 13, 2013

(65) Prior Publication Data

US 2015/0082279 A1    Mar. 19, 2015

(51) Int. Cl.
  *G06F 11/36* (2006.01)
  *G06F 9/44* (2006.01)

(52) U.S. Cl.
  CPC ................... *G06F 11/3672* (2013.01)

(58) Field of Classification Search
  CPC ............. G06F 11/3688; G06F 11/3672; G06F 11/3664; G06F 11/3684
  See application file for complete search history.

(56) References Cited

U.S. PATENT DOCUMENTS

| | | | |
|---|---|---|---|
| 6,496,203 B1 | 12/2002 | Beaumont et al. | |
| 6,546,554 B1 | 4/2003 | Schmidt et al. | |
| 6,973,625 B1 | 12/2005 | Lupo et al. | |
| 7,620,908 B2 | 11/2009 | Klevenz et al. | |
| 7,676,762 B2 | 3/2010 | Shafron | |
| 7,748,609 B2 | 7/2010 | Sachdeva et al. | |
| 7,765,255 B2 | 7/2010 | Cherdron et al. | |
| 8,037,407 B2 | 10/2011 | Ahlert et al. | |
| 8,108,488 B2 | 1/2012 | Derechin et al. | |
| 8,185,910 B2 * | 5/2012 | Swildens | 719/310 |
| 8,280,947 B2 | 10/2012 | Charles | |
| 8,302,012 B2 | 10/2012 | Schmitt | |
| 8,341,603 B2 * | 12/2012 | Li et al. | 717/127 |
| 8,341,608 B2 | 12/2012 | Cepero Gonzalez | |

(Continued)

OTHER PUBLICATIONS

Mesbah et al., Automated cross-browser compatibility testing, May 2011, 10 pages.*

(Continued)

*Primary Examiner* — Thuy Dao
(74) *Attorney, Agent, or Firm* — Schwegman Lundberg & Woessner, P.A.

(57) ABSTRACT

A computer implemented system and method for testing code for implementation in web browsers, implements test class code defining test cases for testing operations on web applications implementable by different web browser types, and implements handler class code comprising code specific to each web browser and defining strategies to be used by test cases. The handler class code implements a handler interface and the test class code uses the handler interface to identify the methods to be used for test cases. A non-transient storage medium stores code for a handler template supporting different web browser types for use in a test environment, the code comprising code to identify browser specific strategies for implementation in the test environment; code to implement a strategy support interface for use by a handler factory to select a handler instance; and code to implement a handler interface for use by a test case to identify methods for testing web browser functions.

13 Claims, 5 Drawing Sheets

(56) References Cited

U.S. PATENT DOCUMENTS

| | | | |
|---|---|---|---|
| 8,683,447 B2* | 3/2014 | Miller | G06F 11/3688 |
| | | | 714/25 |
| 8,739,126 B2* | 5/2014 | Glaser et al. | 717/124 |
| 8,863,085 B1* | 10/2014 | Stahlberg | 717/124 |
| 8,875,102 B1* | 10/2014 | Feng | 717/124 |
| 8,893,087 B2* | 11/2014 | Maddela | 717/124 |
| 8,984,491 B2* | 3/2015 | Miller | G06F 11/3688 |
| | | | 714/25 |
| 9,021,438 B2* | 4/2015 | Dayan | G06F 11/3692 |
| | | | 717/124 |
| 9,141,513 B2* | 9/2015 | Foster | G06F 11/3664 |
| 9,223,684 B2* | 12/2015 | Gittelman | G06F 11/3688 |
| 9,372,787 B2* | 6/2016 | Saar | G06F 11/3688 |
| 2003/0079052 A1 | 4/2003 | Kushnirskiy | |
| 2010/0057836 A1 | 3/2010 | Anbuselvan | |
| 2011/0202901 A1* | 8/2011 | Givoni et al. | 717/125 |
| 2013/0086151 A1 | 4/2013 | Guo-Boynton | |
| 2015/0082144 A1* | 3/2015 | Sudkovich | G06F 17/2247 |
| | | | 715/234 |
| 2016/0147645 A1* | 5/2016 | Kandpal | G06F 11/3672 |
| | | | 717/124 |

OTHER PUBLICATIONS

Suarez et al., An open source virtual globe framework for iOS, Android and WebGL compliant browser, Jul. 2012, 10 pages.*

* cited by examiner

SOFTWARE TESTING SYSTEM AND METHOD

FIELD

Embodiments relate to a software testing system and method and more particularly a system and method for testing code for implementation in web browser software.

BACKGROUND INFORMATION

Software testing platforms are available to allow software developers to develop user interfaces implemented in web browsers. One such software testing platform is the Selenium™ test framework available from SAP AG of Walldorf, Germany. There are however several common types of web browsers, such as Internet Explorer™, Google Chrome™, Mozilla Firefox™, Opera™ and Safari™ Different web browsers behave differently. Tests can be written in an object oriented language such as Java™ and use code in the form of a handler to implement specific user interface elements within the browser. This hence requires a developer to write different handler classes for different browsers.

DETAILED DESCRIPTION

Figure 1:
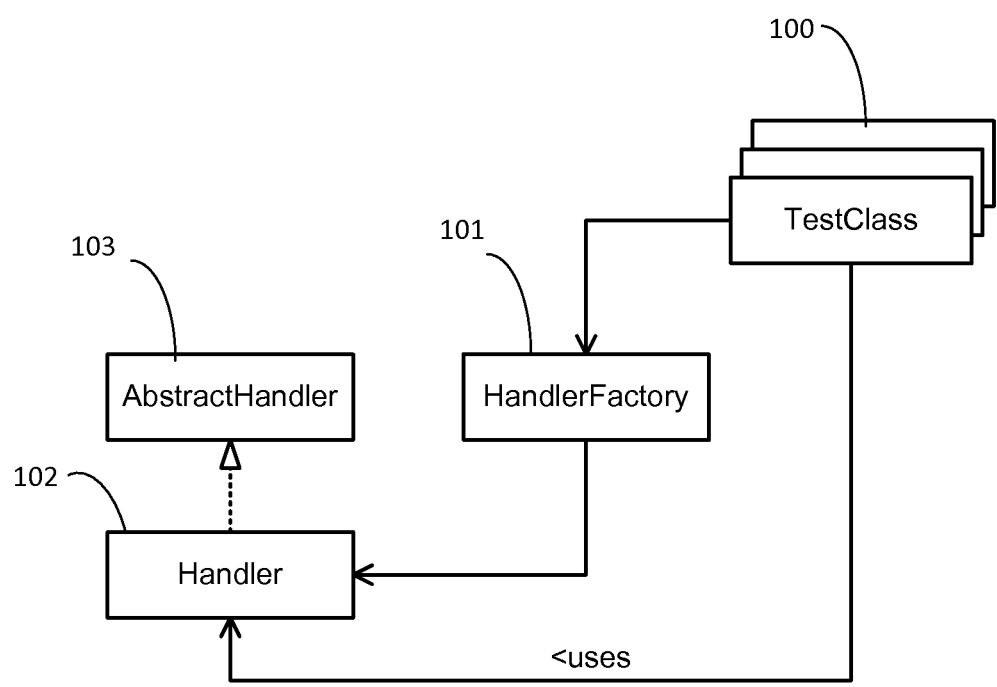
FIG. 1 is a UML diagram illustrating one approach.

Various embodiments are presented herein in the form of at least one of systems, methods, and software to enable the testing of code to be implemented by different types of browsers without requiring near duplicate code, which performs the same general function but differs in browser code specific to implement certain browser specific functions.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable code stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

The software can be provided to a computer on a non-transient storage medium such as read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions The software can also be provided on a transient medium such as a signal. Such a signal can comprise an electrical signal, an optical signal, a magnetic signal, an electromagnetic signal or an acoustic signal for example. One specific example is a signal sending the code over a network such as a TCP/IP signal.

Before describing the embodiments in detail, one approach will be described with reference to FIG. 1.

User interfaces for business software applications can be created using software tools such as SAPUI5™ available from SAP AG of Walldorf, Germany. Such user interfaces run within a web browser such as Internet Explorer™, Google Chrome™, Mozilla Firefox™, Opera™ and Safari™. It is often important that the operations of such user interfaces be tested prior to software being deployed. Software test environments such as Selenium™ are available in which automated test can be created and run against different browsers so that the results can be recorded to check that the user interface operates as expected. The tests in such environments or frameworks are written in an object oriented language such as Java™.

FIG. 1 is a Universal Modeling Language (UML) diagram illustrating the object oriented approach in the Selenium™ framework. Test developers write TestClasses 100 for the implementation of test cases. The TestClasses 100 define types of tests for user interface web elements e.g. user selection of a button to open a new window. Handler classes are written by handler developers to access the functions used by the tests. The TestClasses use a HandlerFactory 101 to identify the Handler 102 used by the TestClass 100. A handler implements the AbstractHandler 103. The TestClass 100 can then use the identified Handler 102 to execute a Testcase to access the target web element. The Handler 102 processes the action and returns the result for evaluation by the Testcase.

A challenge with this approach is that the Handler 102 is specific to a browser since each browser can have different methods for accessing web elements. Each web browser needs its own strategy for performing certain test function. Hence, in such an approach each browser type needs its own handler class in the worst case scenario. This will result in many classes with near similar coding. This duplication of code jeopardizes efforts to develop 'clean code' and increases the complexity for code maintenance.

Figure 2:
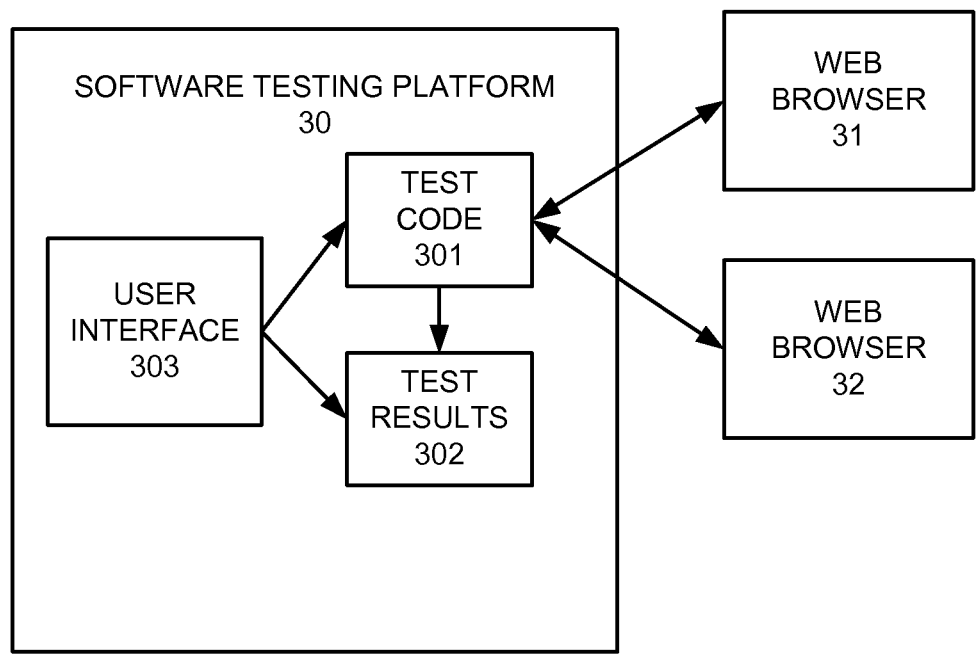
FIG. 2 is a schematic diagram of a software testing system of one embodiment.

FIG. 2 a schematic diagram of a software testing system of one embodiment. The diagram illustrates software modules or components that can be implemented on a processing device such as a computer, or a mobile computing device such a tablet, mobile phone etc.

A software testing platform 30 is provided such as Selenium™ which a developer of a user interface can utilize as a framework for to write test code 301 which performs user interface tests for web elements on web browsers 31 and 32. The tests can be written to emulate user interactions with the web browser. The results of the tests are recorded in memory as test results 302. The platform 30 can provide a user interface 303 to allow a user to write and run the test code 301 and to retrieve the test results 302.

Figure 3:
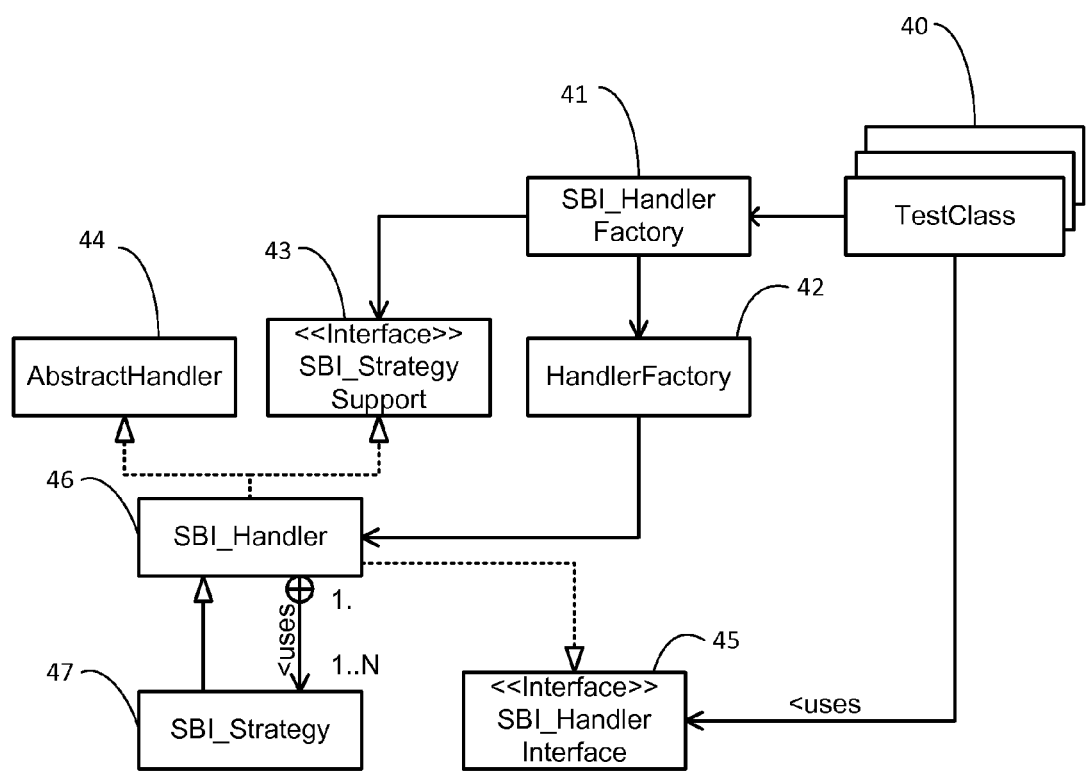
FIG. 3 is a UML diagram illustrating the code framework according to one embodiment.

FIG. 3 is a Universal Modeling Language (UML) diagram illustrating the object oriented approach employing the Selenium™ framework in one embodiment.

A test developer develops Test Classes 40 for performing certain test on web elements in user interface code. Test Classes are Java™ object classes. The Test Classes are code developed to provide browser independent testing of the user interface functionality. The Test Classes use a Handler Factory (SBI_HandlerFactory 41) for handler instantiation. SBI_HandlerFactory 41 wraps the standard HandlerFactory 42 to enable the identification of whether a handler instantiation used by a test is a browser dependent handler or a standard type of handler. Where it is identified that the handler used by the test is not browser dependent, the HandlerFactory 42 can provide the handler instance and allow the test case to use it as in the standard approach. If the used handler instance implements a browser dependent strategy, this is identified and the correct instance is returned to the test class in a decoupled manner, as will be described below.

In this embodiment, a new handler class (SBI_Handler 46) is decoupled from the TestClass 40 by use of the dependency inversion principle. The SBI_Handler 46 implements an interface, SBI_HandlerInterface 45 that defines the methods to be used by the TestClass 40. The SBI_Handler 46 also implements an interface, SBI_StrategySupport 43, for use by the SBI_HandlerFactory 41 to identify if there is a browser dependent strategy for the handler needed by the TestClass 40.

The class, SBI_Strategy 47 defines methods for setting and getting a strategy. It inherits from the SBI_Handler 46 and implements the SBI_Handler 46. Since the SBI_Handler 46 implements the SBIHandlerInterface 45, the SBI_Strategy 47 indirectly implements the SBI_HandlerInterface 45. The SBI_Handler 46 also implements the AbstractHandler 44 as needed in the Selenium™ framework.

Figure 4:
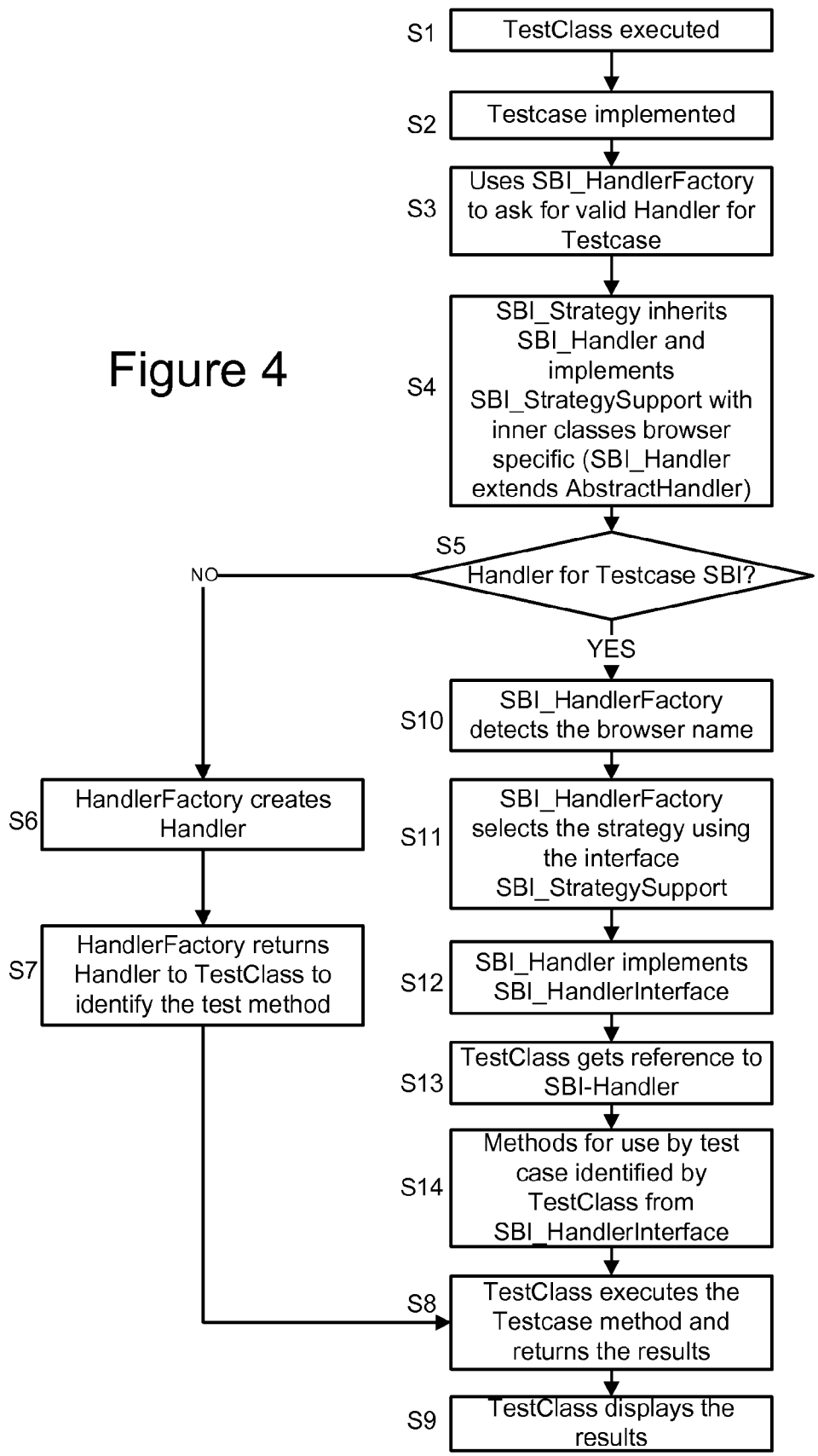
FIG. 4 is a flow chart illustrating the method using the code framework of FIG. 3.

FIG. 4 is a flow chart illustrating the method using the code framework of FIG. 3.

In step S1 the TestClass 40 is executed and implements a Testcase (step S2), which uses the SBI_HandlerFactory 41 to ask for a valid handler for the Testcase. In step S4 the SBI_Strategy 47 inherits the SBI_Handler 46 and implements the SBI_StrategySupport interface 43 with inner classes defined as browser specific. The SBI_Handler 46 also extends the AbstractHandler 44. In step S5, the SBI_HandlerFactory 41 determines whether the handler to be used has a strategy dependent upon the browser by identifying from the SBI_Strategy Support interface 43 whether a method SetStrategy/GetStrategy is set. If a strategy is not set, the handler is not browser dependent and can be provided to the Testcase in the standard manner. Hence, the HandlerFactory 42 creates an instance of the handler to be used (step S6) and the HandlerFactory 42 returns the handler to the TestClass 40 to identify the test method and enables the TestClass 40 to execute the Testcase method and return the results (step S7). The Testcase can then display and/or store the results (step S8).

If the SBI_HandlerFactory 41 determines that the handler has a strategy set, it detects the browser type using a browser driver (step S10). This enables the correct strategy to be selected by the SBI_HandlerFactory 41 using the SBI_StrategySupport interface 43. (step S11). The SBI_Handler 46 implements the SBI_HandlerInterface 45 (step S12) and TestClass 40 receives a reference to the handler in the SBI_HandlerInterface 45 (step S13). The methods for use by the Testcase are identified by TestClass from the SBI_HandlerInterface 45 (step S14). TestClass 40 executes the Testcase method and returns the results (step S9). The Testcase can then display and/or store the results (step S10).

An example of a template in Java™ for use by a developer to develop a handler that supports different types of web browsers is shown in the code below. Such example code can be provided and the code written by a developer following this template or framework can be provided on any suitable non-transient storage medium or transmitted as a transient signal, such as a signal over the internet.

Code template

```
public class SBI_Handler extends AbstractHandler implements SBI_StrategySupport{
private SBI_HandlerInterface _strategy;
/** Constructor */
public SBI_Handler(WebDriver driver) {
   super(driver);
}
/** Defined in SBI_StrategySupport */
public final <T> T GetStrategy( ) {
   return (T) _strategy;
}
/** Defined in SBI_StrategySupport */
public final void SetStrategy( ) {
   switch(BrowserCapabilities.GetBrowsernameAsEnum(driver)) {
      case INTERNETEXPLORER:
         _strategy = new SBI_Handler.SBI_Strategy_IntemetExplorer(driver);
         break;
      case FIREFOX:
         _strategy = new SBI_Handler.SBI_Strategy_FireFox(driver);
         break;
```

-continued

Code template

```
    case CHROME:
       _strategy = new SBI_Handler.SBI_Strategy_Chrome(driver);
       break;
    }
}
/** Inner classes defining different strategies */
   public class SBI_Strategy_InternetExplorer extends SBI_Handler {
     public SBI_Strategy_InternetExplorer(WebDriver driver) {
       super(driver);
     }
     /** Overwrite methods if browser specific action is required */
   }
   public class SBI_Strategy_FireFox extends SBI_Handler {
     public SBI_Strategy_FireFox(WebDriver driver) {
       super(driver);
     }
     /** Overwrite methods if browser specific action is required */
   }
   public class SBI_Strategy_Chrome extends SBI_Handler {
     public SBI_Strategy_Chrome(WebDriver driver) {
       super(driver);
     }
     /** Overwrite methods if browser specific action is required */
   }
/** Start here with code every strategy could use or overwrite. Methods that
Should be used by the test should be declared in SBI_HandlerInterface first */
}
```

Figure 5:
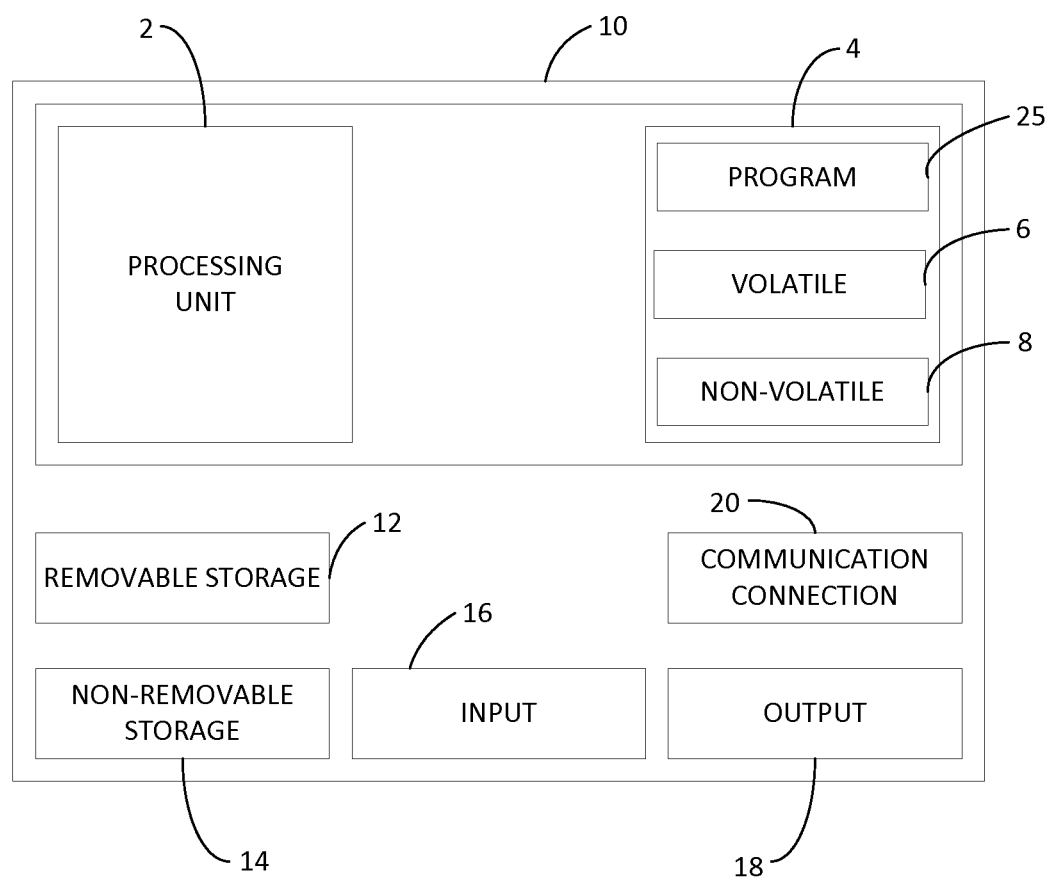
FIG. 5 is schematic diagram of the computer system for the implementation of the method according to one embodiment.

FIG. 5 is a block diagram of a computing system, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 10, may include a processing unit 2, memory 4, removable storage 12, and non-removable storage 14. Memory 4 may include volatile memory 6 and non-volatile memory 8. Computer 10 may include—or have access to a computing environment that includes—a variety of computer-readable media, such as volatile memory 6 and non-volatile memory 8, removable storage 12 and non-removable storage 14. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 10 may include or have access to a computing environment that includes input 16, output 18, and a communication connection 20. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable code stored on a computer-readable storage medium are executable by the processing unit 2 of the computer 10. A hard drive, CD-ROM, and RAM are some examples of articles including a non-transient computer-readable medium.

Various generalized embodiments will now be described.

One embodiment provides a software testing system for testing code for implementation in web browsers, the system comprising code memory storing computer code; and a processor for reading the code in the code memory and executing the code; wherein the code stored in the code memory comprises test class code defining test cases for testing operations on web applications implementable by different web browser types, and handler class code comprising class code specific to each web browser type and defining strategies to be used by test cases, wherein the handler class code is adapted to implement a handler interface and the test class code is adapted to use the handler interface to identify the methods to be used for test cases.

In one embodiment the handler class code is adapted to implement a strategy support interface defining strategies to be implemented dependent upon the web browser type, and the code stored in the code memory includes handler factory class code used by the test class code to obtain an instance of a handler class code by determining the web browser type being executed and by reference to the strategy support interface.

In one embodiment the code stored in the code memory includes strategy class code adapted to implement the handler class code.

In one embodiment the handler class code comprises inner class code defining the strategies to be used for each web browser type.

In one embodiment the handler factory class code is adapted to determine the web browser type using a web browser driver.

In one embodiment the code for implementation in web browsers comprises user interface code.

In one embodiment the code stored in the code memory includes a web browser testing platform providing an environment for implementation of the test class code and the handler class code.

In one embodiment the web browser testing platform comprises SAP Selenium.

Another embodiment provides a non-transient storage medium storing computer code for controlling a computer to test code for implementation in web browsers, the code stored in the medium comprising test class code defining test cases for testing operations on web applications implementable by different web browser types, and handler class code comprising code specific to each web browser type and defining strategies to be used by test cases, wherein the handler class code is adapted to implement a handler interface and the test class code is adapted to use the handler interface to identify the methods to be used for test cases. In an alternative embodiment, the code can be provided on any form of carrier medium such as a transient medium and a non-transient storage medium.

In one embodiment the handler class code is adapted to implement a strategy support interface defining strategies to be implemented dependent upon the web browser type, and the code includes handler factory class code used by the test class code to obtain an instance of a handler class code by determining the web browser type being executed and by reference to the strategy support interface.

In one embodiment the code stored in the code memory includes strategy class code adapted to implement the handler class code.

In one embodiment the handler class code comprises inner class code defining the strategies to be used for each web browser type.

In one embodiment the handler factory class code is adapted to determine the web browser type using a web browser driver.

In one embodiment the code for implementation in web browsers comprises user interface code.

In one embodiment the code stored in the code memory includes a web browser testing platform providing an environment for implementation of the test class code and the handler class code.

In one embodiment the test environment comprises SAP Selenium.

A further embodiment provide a computer implemented method of testing code for implementation in web browsers, the method comprising implementing test class code defining test cases for testing operations on web applications implementable by different web browser types, and implementing handler class code comprising class code specific to each web browser type and defining strategies to be used by test cases, wherein the handler class code implements a handler interface and the test class code uses the handler interface to identify the methods to be used for test cases.

In one embodiment the handler class code implements a strategy support interface defining strategies to be implemented dependent upon the web browser type, the method including implementing handler factory class code used by the test class code to obtain an instance of a handler class code by determining the web browser type being executed and by reference to the strategy support interface.

In one embodiment the method includes implementing strategy class code to implement the handler class code.

In one embodiment the handler class code comprises inner class code defining the strategies to be used for each web browser type.

In one embodiment the handler factory class code determines the web browser type using a web browser driver.

In one embodiment the code for implementation in web browsers comprises user interface code.

In one embodiment the method includes implementing a web browser testing platform providing an environment for implementation of the test class code and the handler class code.

In one embodiment the test environment comprises SAP Selenium.

Another embodiment provides a non-transient storage medium storing code for a handler template supporting different web browser types for use in a test environment, code to identify browser specific strategies for implementation in the test environment; code to implement a strategy support interface for use by a handler factory to select a handler instance; and code to implement a handler interface for use by a test case to identify methods for testing web browser functions. In an alternative embodiment, the code can be provided on any form of carrier medium such as a transient medium and a non-transient storage medium.

In one embodiment the code includes code to identify that the handler extends an abstract handler used in the test environment.

In one embodiment the handler template defines a handler class, and the code to identify specific strategies comprises inner classes.

In one embodiment the test environment comprises SAP Selenium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A computer implemented method of testing code for implementation in web browsers, the method comprising:
   implementing test class code defining a plurality of test cases for testing operations on web applications implementable by a plurality of different web browser types; and
   implementing handler class code defining strategies to be used by at least a portion of the plurality of test cases, wherein the handler class code comprises first code specific to a first web browser type of the plurality of different web browser types and second code specific to a second web browser type of the plurality of different web browser types
   determining that a first test case of the plurality of test cases will use a browser-dependent strategy;
   determining that a first web browser is of the first web browser type based at least in part on interaction with the first web browser via a first web browser driver;
   obtaining a first instance of the handler class code for the first test case based at least in part on the first web browser type, and at least in part by reference to a strategy support interface defining strategies to be implemented dependent on web browser type; and
   adapting, by the first instance of the handler class code, the first test case for execution within the first web browser type when the first test case is communicated to the first web browser via the first web browser driver.

2. A computer implemented method according to claim 1, including implementing strategy class code to implement the handler class code.

3. A computer implemented method according to claim 1, wherein the handler class code comprises inner class code defining the strategies to be used for each web browser type.

4. A computer implemented method according to claim 1, wherein the code for implementation in web browsers comprises user interface code.

5. A computer implemented method according to claim 1, including implementing a web browser testing platform providing an environment for implementation of the test class code and the handler class code.

6. A software testing system for testing code for implementation in web browsers, the software testing system comprising:
   code memory storing computer code; and
   a processor for reading the computer code in the code memory and executing the computer code; and
   wherein the computer code stored in the code memory comprises:
      test class code defining a plurality of test cases for testing operations on web applications implementable by a plurality of different web browser types; and
      handler class code defining strategies to be used by at least a portion of the plurality of test cases, wherein the handler class code comprises first code specific to a first web browser type of the plurality of different web browser types and second code specific to a second web browser type of the plurality of different web browser types;
   wherein the code memory comprises code that, when executed by the processor, causes the processor to perform operations comprising:
      executing a handler factory;
      determining, by the handler factory, that a first test case of the plurality of test cases will use a browser-dependent strategy;
      determining, by the handler factory, that a first web browser is of the first web browser type based at least in part on interaction with the first web browser via a first web browser driver;
      obtaining, by the handler factory, a first instance of the handler class code for the first test case based at least in part on the first web browser type, and at least in part by reference to a strategy support interface defining strategies to be implemented dependent on web browser type; and
      adapting, by the first instance of the handler class code, the first test case for execution within the first web browser type when the first test case is communicated to the first web browser via the first web browser driver.

7. A software testing system according to claim 6, wherein the computer code stored in the code memory includes strategy class code adapted to implement the handler class code.

8. A software testing system according to claim 6, wherein the handler class code comprises inner class code defining the strategies to be used for each web browser type.

9. A software testing system according to claim 6, wherein the computer code for implementation in web browsers comprises user interface code.

10. A software testing system according to claim 6, wherein the computer code stored in the code memory includes a web browser testing platform providing an environment for implementation of the test class code and the handler class code.

11. A non-transient storage medium storing computer code for a handler template supporting a plurality of different web browser types for use in a test environment, the computer code comprising:
   test class code defining a plurality of test cases for testing operations on web applications implementable by a plurality of different web browser types;
   handler class code defining strategies to be used by at least a portion of the plurality of test cases, wherein the handler class code comprises first code specific to a first web browser type of the plurality of different web browser types and second code specific to a second web browser type of the plurality of different web browser types;
   computer code for executing a handler factory, wherein the handler factory is programmed to perform operations comprising:
      determining that a first strategy used by a first test case for implementation in the test environment is browser specific;
      determining that a first web browser is of the first web browser type based at least in part on interaction with the first web browser via a first web browser driver
   obtaining a first instance of the handler class code for the first test case based at least in part on the first web browser type, and at least in part by reference to a strategy support interface defining strategies to be implemented dependent on web browser type; and
   computer code for executing the first instance of the handler class code, wherein the first instance of the handler class code is programmed to perform operations comprising adapting the first test case for execution within the first web browser type when the first test case is communicated to the first web browser via the first web browser driver.

12. A non-transient storage medium according to claim 11, wherein the computer code includes computer code to identify that the handler instance extends an abstract handler used in the test environment.

13. A non-transient storage medium according to claim 11, wherein the handler template defines a handler class, and the computer code to identify specific strategies comprises inner classes.

* * * * *